Nov. 4, 1958

R. H. RICHMOND 2,858,943

STRAINER FLAME ARRESTOR

Filed Feb. 4, 1955

INVENTOR.
ROY H. RICHMOND.
BY
Christy, Parmelee & Strickland.
ATTORNEYS.

United States Patent Office 2,858,943
Patented Nov. 4, 1958

2,858,943

STRAINER FLAME ARRESTOR

Roy H. Richmond, Wellsburg, W. Va., assignor to Eagle Manufacturing Company, Wellsburg, W. Va., a corporation of West Virginia Application February 4, 1955, Serial No. 486,144

4 Claims. (Cl. 210—474)

This invention is directed to strainers for mounting in the filling opening of containers used in storing and dispensing inflammable liquids. More specifically the invention is concerned with an improved type of strainer in which the members are mechanically locked together so as to provide a strainer which prevents passage of foreign materials into the container and provides a safety enclosure about the strainer preventing ignition of the inflammable fluids within the container from sparks or other causes of ignition of the fluid passing through the strainer.

An object of the invention is to provide a new and novel form of manufacture of such a strainer without the use of soldered joints as heretofore practiced.

Another object of the invention is to provide a strainer having inner and outer screen faces mechanically locked together and retained in assembled relation.

In the drawings forming part of this disclosure, Fig. 1 shows in elevation the strainer of the invention;

Figure 1:
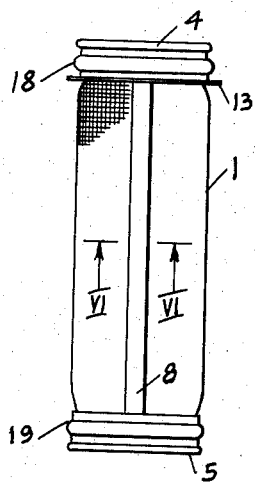
Figure 2:
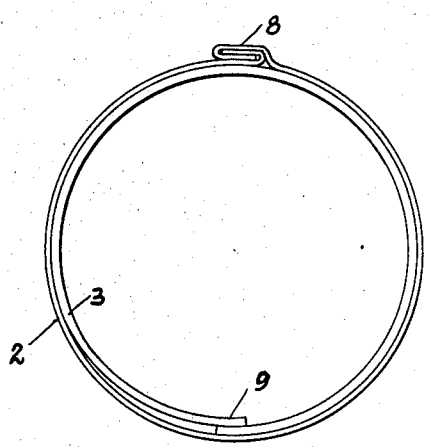
Fig. 2 shows a cross section through the strainer.
Figure 3:
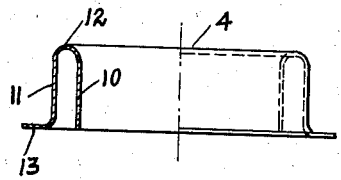
Fig. 3 shows one of the end caps of the strainer partly in elevation and partly in section.
Figure 5:
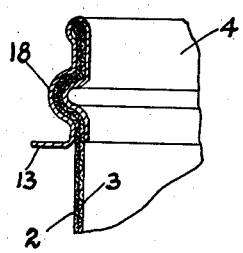
Fig. 5 shows a typical section through the end caps illustrating the manner of locking the caps and the strainer screens together.
Figure 4:
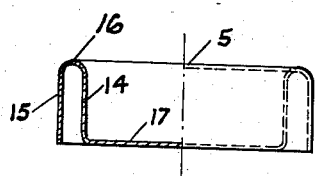
Fig. 4 shows the bottom end cap of the strainer partly in section and partly in elevation.
Figure 7:
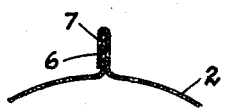
Figs. 6 and 7 are enlarged cross sections showing successive steps in forming the mechanical lock of the screen taken on the lines VI—VI of Fig. 1.
Figure 6:
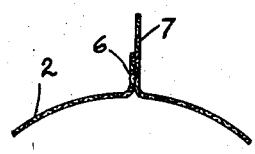

Referring now in detail to the drawings, reference character 1 indicates the strainer in general comprising an outer screen 2, inner screen 3, top end cap 4 and a bottom end cap 5. The screen 2 is of the wire screen type with the openings therein sufficiently small to prevent passage of flame through the screen and yet permit free flow of the liquid being screened. The screen may be made of any suitable material, but for the present purpose brass is preferable. A rectangular piece of suitable size has longitudinal flanges 6 and 7 formed on opposite sides thereof, the flange 7 being of greater width than the flange 6 and the spacing between the flanges being sufficient to provide the desired circumference of the strainer. The flanged rectangular piece of screen is formed into a cylinder by any suitable means with the flanges 6 and 7 abutting as shown in Fig. 6 of the drawings. The portion of the flange 7 extending above the flange 6 is folded over flange 6 as shown in Fig. 7 of the drawings. Thereafter both flanges are again folded flat against the outer periphery of the screen and pressed flat by any suitable means so as to provide the mechanical lock indicated by the reference character 8 on Figs. 1 and 2 of the drawings. Preferably the locked flange 8 extends the full length of the cylinder screen 2. Within the screen 2 is another substantially cylindrically shaped wire screen 3 preferably of larger mesh formed from a rectangular piece of screen and preferably having their edges overlapping as indicated at 9 on Fig. 2 of the drawings. This screen 3 is substantially coextensive with the screen 2 and its primary purpose is to restrain passage of foreign materials into the interior of the storage and dispensing container within which the strainer is mounted. The screen 3 also serves to reinforce screen 2.

At the upper or top end of the strainer is mounted a member 4 which is preferably in the shape of a continuous ring having spaced inner wall 10 and outer wall 11 with a connecting wall 12. The diameter of the walls 10 and 11 and their spacing being such as to freely receive an end of the strainer with the locking seam freely passing between the walls 10 and 11. The outer wall 11 of the member 4 is provided with a suitable peripheral flange 13 extending outwardly therefrom and adapted to engage a mating flange on the container to retain the strainer in position on the container. At the opposite end, or bottom of the strainer, is mounted an end cap 5 having spaced inner and outer walls 14 and 15 with connecting wall 16. The spacing of the walls 14 and 15 is such as to freely receive the end of the strainer and the locking seam 8. The inner walls 14 are connected by a member 17 providing a closure for the screen preventing foreign matter from passing axially through the strainer into the container. The caps 4 and 5 are locked in place upon the screen by suitable deformation of the walls of the caps such as to provide the beads 18 and 19 by deflecting the inner and outer walls of the cap and the container screen to one side of the plane of the walls. Preferably the beads 18 and 19 are deflected outwardly so as not to restrict the normal spacing between the inner walls of the members 4 and 5.

As an alternate form of construction the inner larger mesh screen 3 may be omitted from the strainer. With either the preferred or alternate form of construction, it will be apparent that the mechanically locked seam 8 provides various advantages over the heretofore commonly used soldered joint. There is no opportunity for the seam to break intermediate its length as in a faulty soldered job and the seam of the invention provides additional screening surface not possible with the soldered type of screen. The mechanically locked seam 8 in addition to being more efficient is more economical since it can be uniformly formed and assembled mechanically without use of manual labor as is usually necessary with the soldered type joint which requires the screeen to be cleaned, the solder heated and trimmed after application to the screen. The end caps 4 and 5 may each be suitably pressed from a piece of sheet metal and may be readily deformed by any of the beading tools or operations known to the prior art. By reason of the small mesh of the screen 2, it is impossible for flame within the strainer to pass through the screen 2 and ignite the fluid within the body of the container, thus making a safety flame arresting strainer which meets all the requirements of the safety underwriters.

I claim:

1. A strainer for mounting in the filling opening of containers for storing and dispensing inflammable liquids, an open ended wire screen cylinder having a mechanically interlocked folded flange longitudinal seam at one side of the periphery thereof, a ring shaped open ended top member having spaced side walls connected at one end to provide an annular inverted U-shaped opening freely receiving one end of the seamed screen cylinder, said member being assembled on one end of said cylinder and locked in position by displacing an intermediate portion of the side walls and the contained portion of screen laterally relative to the main plane of said side walls, a ring shaped bottom member having spaced side walls connected at one end to provide an annular U-shaped opening freely receiving the bottom end of the seamed screen cylinder, a transverse wall closing the opening formed by the inner wall of the botom member and disposed within the cylinder, said bottom member being locked in fixed relation on the end of said screen by displacing a portion of the side walls and contained screen laterally of the main plane of said side walls.

2. A strainer as in claim 1 wherein the top ring member is provided with a peripheral flange at the inner end of the outer wall thereof, said flange having an outer diameter greater than that of any other portion of the strainer beneath said flange.

3. A strainer as in claim 1 wherein the ring members at each end thereof have their walls connected by a portion which overlaps the ends of the screen cylinder.

4. A strainer as in claim 1 wherein the screen cylinder is reinforced by a second wire screen cylinder the adjacent peripheral edges of the screen overlapping at the periphery of the cylinder and retained in shape by being disposed within the top and bottom members of the first named cylinder.

References Cited in the file of this patent

UNITED STATES PATENTS

| | | |
|---|---|---|
| 243,232 | Fancher | June 21, 1881 |
| 1,725,386 | Anschicks | Aug. 20, 1929 |
| 2,075,639 | Castle | Mar. 30, 1937 |
| 2,174,577 | Riedman | Oct. 3, 1939 |

FOREIGN PATENTS

| | | |
|---|---|---|
| 555,812 | Great Britain | Sept. 8, 1943 |